United States Patent

Genzel et al.

[11] Patent Number: 5,906,649
[45] Date of Patent: May 25, 1999

[54] PROCEDURE FOR CONTROLLING CONTINUOUS VARIABLE TRANSMISSIONS IN MOTOR VEHICLES

[75] Inventors: Michael Genzel, Robtal; Rodolfo Möller, Nürnberg; Armin Tonn, Roth; Willem Kuster, Ingolstadt; Andreas Leicht, Gaimersheim, all of Germany

[73] Assignees: Temic Telefunken microelectronic GmbH, Heilbronn, Germany; Audi AG, Ingolstadt, Germany

[21] Appl. No.: 08/780,417

[22] Filed: Jan. 8, 1997

[30] Foreign Application Priority Data

Jan. 20, 1996 [DE] Germany ............................ 196 02 033

[51] Int. Cl.$^6$ ...................................................... G06G 7/70
[52] U.S. Cl. ................................ 701/51; 701/58; 701/61; 477/46; 477/49; 474/18
[58] Field of Search ................................... 701/51, 52, 54, 701/58, 61, 67, 68; 477/39, 43, 46, 48, 49, 47, 45; 474/11, 18, 28, 70, 110

[56] References Cited

U.S. PATENT DOCUMENTS

| | | | |
|---|---|---|---|
| 4,852,429 | 8/1989 | Künzer et al. | 701/54 |
| 5,009,129 | 4/1991 | Morimoto et al. | 477/49 |
| 5,052,247 | 10/1991 | Kato et al. | 477/109 |
| 5,319,999 | 6/1994 | Morishige et al. | 477/46 |
| 5,337,628 | 8/1994 | Hendriks et al. | 477/48 |
| 5,366,416 | 11/1994 | Roovers et al. | 474/18 |
| 5,431,602 | 7/1995 | Hendriks et al. | 474/28 |
| 5,545,105 | 8/1996 | Roovers et al. | 477/43 |
| 5,700,225 | 12/1997 | Roovers et al. | 477/46 |
| 5,707,313 | 1/1998 | Suzuki | 477/43 |

FOREIGN PATENT DOCUMENTS

| | | |
|---|---|---|
| 0421241 | 4/1991 | European Pat. Off. . |
| 0433929 | 6/1991 | European Pat. Off. . |
| 0697548 | 2/1996 | European Pat. Off. . |
| 2699978 | 7/1994 | France . |
| 2220038 | 12/1989 | United Kingdom . |

*Primary Examiner*—Jacques H. Louis-Jacques
*Attorney, Agent, or Firm*—VENABLE; Norman N. Kunitz; Michael A. Sartori

[57] ABSTRACT

A continuously variable transmission in a motor vehicle is regulated using a controller comprising a first control circuit as a speed controller for regulating the transmission input speed as the product calculated from the transmission output speed and the transmission ratio, complete with a summation element at the controller input as well as with a control element, and a second control circuit post-connected to the first control circuit as a speed gradient controller for regulating the time derivative of the transmission input speed, complete with a summation element at the controller input. To preset a variable control response of the controller, different filter functions are defined, in relation to the operating conditions of the motor vehicle, as a fixed relationship between the input quantity control deviation as the difference calculated from nominal and actual values of the transmission input speed and the output quantity nominal gradient value of the transmission input speed, and fed to the control element of the first control circuit, which control element has been designed as a filter element. Depending on the current operating conditions of the motor vehicle, and using of the predefined filter functions, the filter element generates a filter function used as a current filter function. The function values of the current filter function are fed as filter values and as a reference magnitude from the filter element to the summation element at the controller input of the second control circuit.

20 Claims, 2 Drawing Sheets

PROCEDURE FOR CONTROLLING CONTINUOUS VARIABLE TRANSMISSIONS IN MOTOR VEHICLES

BACKGROUND OF THE INVENTION

The drive unit of motor vehicles (engine and power transmission train) is increasingly subjected to regulating and control mechanisms in order to optimize the interplay of an engine and its associated transmission. For instance, to reduce fuel consumption in motor vehicles, it will be necessary not only to improve engine control systems but also to adapt transmission ratios. To achieve this, automatic transmissions present themselves as a solution, with continuously variable transmissions (CVTs) in particular being increasingly used. A CVT allows continuous transmission adjustment until the required transmission ratio has been set. By means of a transmission element (chain, band, belt, etc) located between the discs of two disc assemblies, the required transmission ratio can be continuously adapted. By applying the same contact pressure values on these two disc assemblies, which corresponds to the so-called pretensioning force, the force level for this transmission element is adjusted. Specifying different values for this contact pressure on the two disc assemblies creates an additional transport force component for moving this transmission element. By varying this contact pressure, and thus the transport force, the transmission ratio may be continuously varied in any number of steps.

The regulating processes employed in continuously variable transmissions normally use transmission or speed controllers to effect control. The transmission input or drive speed is controlled by means of a control circuit designed as a speed controller. This transmission input or drive speed represents the product from transmission output speed, which is proportional to vehicle velocity, or drive speed (disturbance variable), and transmission ratio (control variable). To this end, the control circuit features a summation element at the controller input. As an augend, this summation element is given the nominal value of the transmission input speed (reference magnitude), and the addend is provided by the actual value of the transmission input speed (controlled variable). The control deviation, which is obtained at the output of the summation element by calculating the difference between the two quantities nominal value of the transmission input speed and actual value of the transmission input speed, is fed to a control element consisting of a proportional-action-controller, limiter, and lowpass filter. The output of this control element then supplies the time derivative (gradient) of the transmission input speed. In order to improve control response, the speed controller can be provided with (post-connected to) a second control circuit of acceleration control type, where the time derivative (gradient) of the transmission input speed provided as a nominal value by the control output of the speed controller represents the reference magnitude. In other words, in addition to speed control, a speed gradient control is also effected.

The disadvantage of these regulating processes for controlling continuously variable transmissions is that the control element of the speed controller, which control element generates the nominal value of the transmission input speed gradient, based on the control deviation (the speed difference of the transmission input speeds), and thus determines the control response, features a constant proportional constituent, that is, the controlling speed, or controlling rate, of the transmission input speed, and thus the control response is always the same value (irrespective of the relevant nominal value specified for the transmission input speed). Therefore, this always specifies the same control response so that it is not possible to influence (even though this might often be desirable) the output quantity at the control output of the speed controller, or the reference magnitude of the speed gradient control in relation to the nominal value specified for the transmission input speed, which in turn will affect driving safety or ride comfort.

SUMMARY OF THE INVENTION

The object of this invention is to provide a process for regulating continuously variable transmissions in motor vehicles by means of a controller comprising: a first control circuit (1) as a speed controller for regulating the transmission input speed ($n_{IN}$) as the product calculated from the transmission output speed ($n_{OUT}$) and the transmission ratio (ÜV), complete with a summation element (11) at the controller input (RE1), as well as with a control element (12); and a second control circuit (2) post-connected to the first control circuit (1) as a speed gradient controller for regulating the time derivative (d/dt) of the transmission input speed ($n_{IN}$), complete with a summation element (21) at the controller input (RE2). In order to preset a variable control response of the controller, different filter functions (FF) will be defined in relation to the operating conditions of the motor vehicle, as a fixed relationship between the input quantity control deviation ($\Delta 1$) of the transmission input speed ($n_{IN}$), being the difference calculated from nominal value ($n_{IN,SOLL}$) and actual value ($n_{IN,IST}$) of the transmission input speed ($n_{IN}$), and the output quantity nominal gradient value (d/dt($n_{IN}$)) of the transmission input speed ($n_{IN}$). Depending on the current operating conditions of the motor vehicle, the control element (12) of the first control circuit (1), which control element (12) has been designed as a filter element, generates a filter function as a current filter function (FFa) by means of the predefined filter functions (FF). Filter element (12) feeds the function values of the current filter function (FF a) as filter values (FW) to the summation element (21) on the controller input (RE2) of the second control circuit (2) as reference magnitude (FG2).

In the process presented here, which is intended for regulating continuous variable transmissions in motor vehicles, and with a two-stage controller comprising speed controller and subordinated (post-connected) speed gradient controller, the control element of the speed controller is implemented by means of a non-linear filter element. Defining different filter functions for the filter element, as well as the course of each respective filter function, enables a control response comprising a variable (non-constant) proportional constituent and a variable limit. Thus, if a variation of the nominal transmission input speed value, which acts as reference magnitude or input quantity of the speed controller, is necessary or required, the course of such control action and, therefore, the gradient (the controlling speed) of the nominal transmission input speed value as an output quantity of the speed controller can be variably preset by varying the control influence on the gradient of the nominal transmission input speed value (that is, on the preset nominal value for the post-connected speed gradient controller) in relation to the current operating conditions of the motor vehicle. The respective filter function course (range limits, limiting values, maximum values, minimum values, slopes, etc.), that is the functional dependence of the output quantity gradient (controlling speed) of the nominal transmission input speed value on the input quantity nominal transmission input speed value, and thus the respective course of the control action, can be preset or varied, for instance, by using a (two-dimensional) characteristic curve or a (three-dimensional) characteristic field, in line with different operating conditions of the motor vehicle. Examples of these include: in line with the respective driving situation (overtaking, accelerator "kickdown", braking), and/or current vehicle speed, and/or current transmission ratio, and/or the maximum possible mechanical changeover speed for the transmission ratio, and/or environmental conditions (for instance, slip detection, pull-/push-operation, towing a trailer, climbing a hill), and/or driver type (engine performance required by the respective driver), and/or the actual value of the control deviation (speed difference obtained from the actual value and the nominal transmission input speed value) etc. Depending on these criteria, different filter functions are defined complete with a characteristic functional action (for instance, characteristic curve action or characteristic field action). By means of at least one of the above-mentioned criteria for the current operating conditions of the motor vehicle, and using the defined filter functions, the respective adequate filter function is generated as the currently applicable filter function. This current filter function, with its characteristic functional action (for instance, characteristic curve action or characteristic field action) and its function values, yields the filter values as a speed controller output quantity which is applied to the speed gradient controller as reference magnitudes. In the event of an unclear characterization of current operating conditions, or if it is not possible to allocate such current operating conditions to a particular filter function, two or more filter functions may be used for determining the filter values (the function values of the current filter function). Thus, for instance, it is possible to interpolate between the function values of two or more filter functions, and the function value averaged in this way may be fed to the speed gradient controller as a filter value. When defining filter functions (that is, presetting the function values of filter functions), the system limits of the controller, empirical customer requirements, and the driving characteristics of the motor vehicle (limiting values, driveability, etc.) must be taken into account.

Due to the variable presetting of the nominal value for the transmission input speed gradient (and thus for the controlling speed of the transmission ratio) possible by means of the process presented here, the control response of the two-stage controller, comprising a speed controller and a post-connected speed gradient controller, can be adapted to different conditions or requirements, in this way improving riding comfort, vehicle handling, and thus also vehicle safety.

BRIEF DESCRIPTION OF THE DRAWINGS

By means of the drawing complete with FIGS. 1 to 3, the process for regulating continuous variable transmissions is illustrated, using the example of an embodiment in the continuously variable transmission of a motor vehicle.

DESCRIPTION OF A PREFERRED EMBODIMENT

Figure 1:
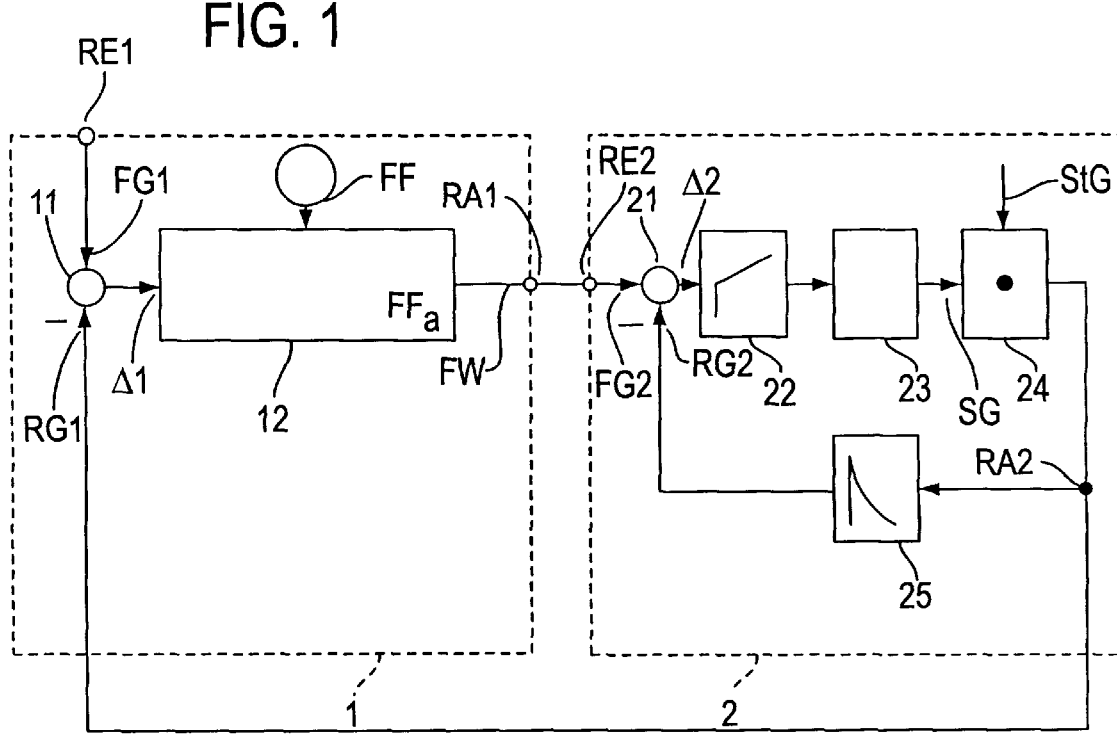
FIG. 1 shows a block diagram of the controller complete with the two control circuits for the speed controller as well as the speed gradient controller.

According to FIG. 1, the two-stage controller comprises the first control circuit 1 (speed controller) for regulating the transmission input speed $n_{IN}$ as the product $n_{OUT} \cdot \ddot{U}V$ of the transmission output speed $n_{OUT}$ (this is proportional to the actual speed of the motor vehicle) and the transmission ratio $\ddot{U}V$, and the second control circuit 2 (speed gradient controller) post-connected (subordinated) to the first control circuit 1 for regulating the gradient (the time derivative d/dt) of the transmission input speed $n_{IN}$.

The first control circuit 1 features a summation element 11 at the controller input RE1, which is provided—as augend— with the nominal value $n_{IN,SOLL}$ of the transmission input speed $n_{IN}$ as reference magnitude FG1, and,—as addend— with the actual value $n_{IN,IST}$ of the transmission input speed $n_{IN}$ as controlled variable RG1. The control deviation $\Delta 1$ ($\Delta 1 = n_{IN,SOLL} - n_{IN,IST}$) obtained from calculating the difference between the two quantities $n_{IN,SOLL}$ and $n_{IN,IST}$ at the output of summation element 11 is fed to control element 12 designed as a filter element at whose output (the controller output RA1) the desired value $d/dt(n_{IN,SOLL})$ of gradient $d/dt(n_{IN})$ of the transmission input speed $n_{IN}$ applies.

The second control circuit 2 features a summation element 21 which, at controller input RE2, is connected to controller output RA1 of the first control circuit 1. The summation element 21 is fed, as augend from the first control circuit 1, the desired value $d/dt(n_{IN,SOLL})$ of gradient $d/dt(n_{IN})$ of the transmission input speed $n_{IN}$ as reference magnitude FG2, and, as addend, the actual value $d/dt(n_{IN,IST})$ of gradient $d/dt(n_{IN})$ of the transmission input speed $n_{IN}$ as controlled variable RG2. The control deviation $\Delta 2$ ($\Delta 2 = d/dt(n_{IN,SOLL}) - d/dt(n_{IN,IST})$) obtained from calculating the difference between the two quantities $d/dt(n_{IN,SOLL})$ and $d/dt(n_{IN,IST})$ at the output of summation element 21 is fed to the control element 22 designed as a PI controller. Via actuator 23, or the controlled system, the control element 22 is preset, as control variable SG, the transmission ratio $\ddot{U}V$. The multiplication element 24 connected to the output of actuator 23 is fed, as multiplicand, the control variable SG transmission ratio $\ddot{U}V$ and, as multiplier, the transmission output speed $n_{OUT}$ acting as disturbance variable StG. By multiplication of the two values transmission ratio $\ddot{U}V$ and transmission output speed $n_{OUT}$, the actual value $n_{IN,IST}$ of transmission input speed $n_{IN}$ is obtained. The actual value $n_{IN,IST}$ of transmission input speed $n_{IN}$ at output RA2 of the second control circuit 2 is fed as control variable RG1 to summation element 11 at controller input RE1 of the first control circuit 1 and, via a differential element 25 for calculating the time derivative, as control variable RG2 to summation element 21 at controller input RE2 of the second control circuit 2.

Depending on the operating conditions of the motor vehicle, different filter functions FF are defined and provided to the filter element 12. By the action of filter function FF, a fixed relationship between the control deviation $\Delta 1 = n_{IN,SOLL} - n_{IN,IST}$ and the desired value $d/dt(n_{IN,SOLL})$ for gradient $d/dt(n_{IN})$ of transmission input speed $n_{IN}$ is preset for the output quantity of filter element 12. In the event of sudden changes in the desired value $n_{IN,SOLL}$ of transmission input speed $n_{IN}$, a defined desired value for gradient $d/dt(n_{IN})$ of transmission input speed $n_{IN}$ is always required in relation to control deviation $\Delta 1$. In other words, the action of filter function FF checks how (by means of which gradient) the control deviation $\Delta 1 = n_{IN,SOLL} - n_{IN,IST}$ is set to zero. Filter function FF is designed, for example, according to comfort, maximum vehicle acceleration, or optimum fuel consumption. Depending on the current operating conditions of the vehicle, and using the filter functions FF provided to the filter element 12, the respective adequate current filter function FFa is generated (either by using the function values of just one of the filter functions FF or by using the function values of at least two filter functions FF). As the output quantity of filter element 12, the function values of the current filter function Ffa as filter values FW are fed to the summation element 21 at controller input RE2 of the second control circuit 2 as reference magnitude FG2. By appropriately selecting the action of filter functions FF for filter element 12, or by suitable generation of the respective current filter function FFa or filter values FW, the control response of the second control circuit 2 (speed gradient controller) is influenced such that, in the event of any changes in the desired value $n_{IN,SOLL}$ of transmission input speed $n_{IN}$, the transmission ratio ÜV, as control variable SG, is changed in line with current requirements (for instance, to provide optimum fuel consumption).

Figure 2:
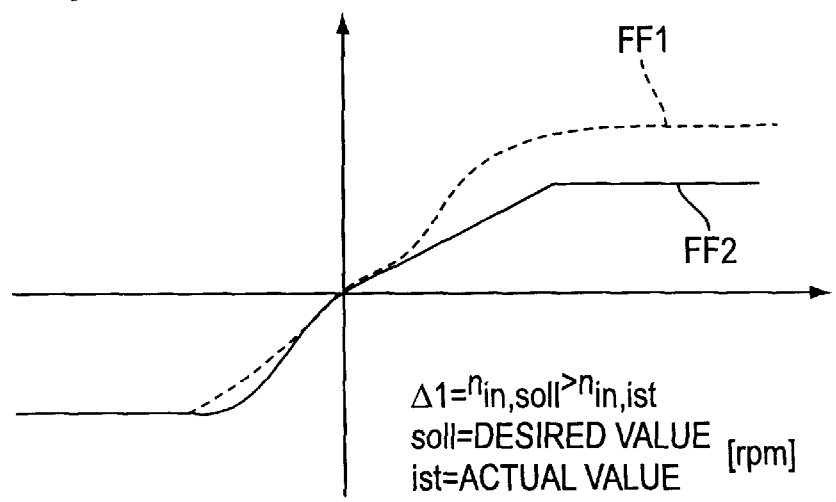
FIGS. 2 and 3 show the filter function actions of the speed controller filter element for two different criteria characterizing the operating conditions of the motor vehicle. The abbreviation "soll" is for the desired value, and "ist" is for the actual value.
Figure 3:
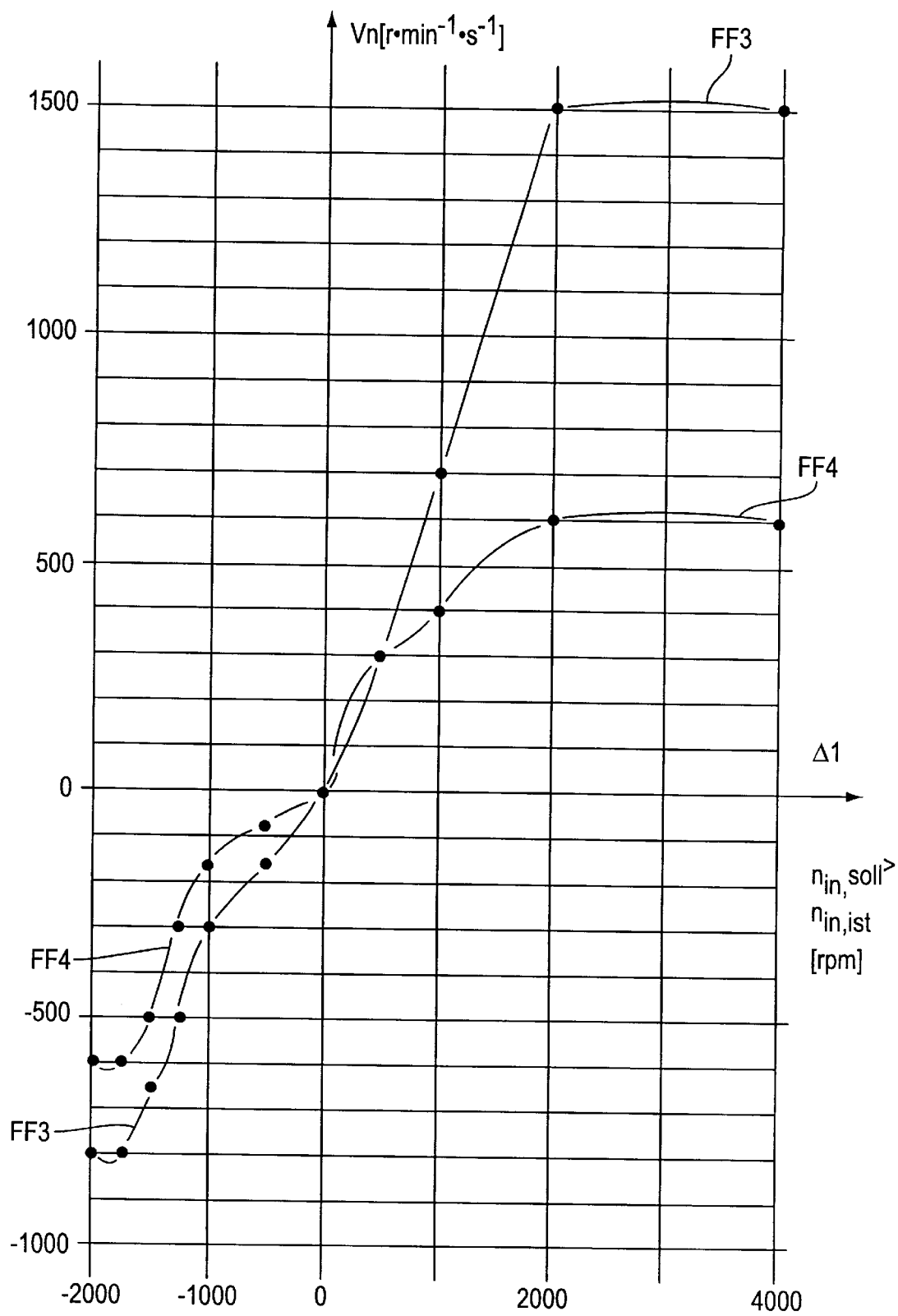

By way of example, FIGS. 2 and 3 show the action of different filter functions FF complete with the input quantity desired value $n_{IN,SOLL}$ of the transmission input speed $n_{IN}$ and the output quantity controlling speed $v_n$ of desired value $n_{IN,SOLL}$ of transmission input speed $n_{IN}$ in relation to two characteristic criteria for the operating conditions of the motor vehicle.

FIG. 2 illustrates the qualitative action for filter functions depending on driver type by using two filter functions FF1 and FF2 as an example. The action of filter function FF1 is characteristic for a "sporty" driver with a high performance requirement, and the action of filter function FF2 represents an "economical" driver with a low performance requirement. If, by operating the accelerator, a driver requires a higher performance and thus a higher desired value $n_{IN,SOLL}$ of transmission input speed $n_{IN}$ ($n_{IN,SOLL}>n_{IN,IST}$), the "sporty" driver, assisted by the filter function FF1 and the resulting controlling speed $v_n$ of the desired value $n_{IN,SOLL}$ of transmission input speed $n_{IN}$, more quickly achieves a shorter transmission ratio ÜV than the "economical" driver who uses filter function FF2. In the event of negative changes in the desired value $n_{IN,SOLL}$ of transmission input speed $n_{IN}$ ($n_{IN,SOLL}<n_{IN,IST}$), the situation is reversed, that is the "economical" driver, by means of filter function FF2 and the resulting controlling speed $v_n$, more quickly achieves a longer transmission ratio ÜV than the "sporty" driver who uses filter function FF1. Therefore, to determine the driver-type-dependent filter values FW fed to speed gradient controller 2, each driver of the motor vehicle can either be allocated one of these filter functions FF1, FF2 as a current filter function FFa or, depending on the driving behavior of the relevant driver, the current filter function FFa may be obtained by appropriate interpolation between these two filter functions FF1, FF2.

FIG. 3 illustrates the quantitative course for filter functions which depend on the driving condition of the motor vehicle (push-/pull-operation). Here, two filter functions FF3 and FF4 are used as examples, with the course of filter function FF3 being characteristic for push operation (i.e., the motor vehicle is not driven by the engine) and the course of filter function FF4 representing pull operation (i.e., the motor vehicle is driven by the engine). In this connection, push operation is assumed if the accelerator pedal angle or throttle valve angle is less than 1°, and pull operation is assumed if the accelerator pedal angle or throttle valve angle is greater than 1°. In the event of positive changes in the desired value $n_{IN,SOLL}$ of transmission input speed $n_{IN}$ ($n_{IN,SOLL}>n_{IN,IST}$), it is possible, in push operation assisted by filter function FF3 and the resulting controlling speed $v_n$, to achieve more quickly a shorter transmission ratio ÜV than in pull operation by means of filter function FF4. For instance, this enables the braking torque of the motor vehicle in push operation (calculated from engine braking torque and transmission ratio ÜV) to be controlled irrespective of the controlling speed $v_n$ required in pull operation (without engine braking action). The same distinction applies to negative changes in the desired value $n_{IN,SOLL}$ of transmission input speed $n_{IN}$, i.e. in the event of a controlling operation towards a longer transmission ratio ÜV ($n_{IN,SOLL}<n_{IN,IST}$) In push operation (filter function FF3), the longer transmission ratio ÜV is achieved more quickly than in pull operation (filter function FF4), which allows the braking torque of the motor vehicle in push operation to be kept as low as possible.

For other operating conditions of the motor vehicle or other constraints (for instance: kickdown, idling, applied brake), the action of filter function FF (in particular its slope and limiting values) can be appropriately adapted or varied. Furthermore, the current filter function FFa most suitable (adequate) when two or more criteria are used for the operating conditions of the motor vehicle can either be determined by setting a pre-defined filter function FF or by suitable interpolation between at least two pre-defined filter functions FF. The filter function FF can also be obtained by interpolation from a characteristic field, for instance, via the control deviation $\Delta 1 = N_{IN,SOLL} - n_{IN,IST}$ and a code number for the driver type (such as 0 for an "economical" driver and 128 for a "sporty" driver).

What is claimed is:

1. Process for regulating a continuously variable transmission in a motor vehicle using a controller, the controller comprising:

a first control circuit for regulating a transmission input speed of the continuously variable transmission determined as a product of a transmission output speed and a transmission ratio, the first control circuit comprising a first controller input, a first summation element coupled to the first controller inputs a control element coupled to the first summation element, and a first controller output coupled to the control element, and a second control circuit coupled to the output of the first control circuit for regulating the time derivative of the transmission input speed of the continuously variable transmission, the second control circuit comprising a second controller input coupled to the first controller output, a second summation element coupled second controller input, wherein the process comprises the steps of:

maintaining a set of filter functions, each filter function corresponding to an operating condition of the motor vehicle and defining a relationship between transmission input speed deviation and desired transmission input speed gradient, transmission input speed deviation being determined from a desired transmission input speed and an actual transmission input speed;

generating a current filter function using the control element of the first control circuit based on a current operating condition of the motor vehicle and the set of filter functions, and supplying the current filter function from the first control circuit to the second summation element of the second control circuit.

2. Process according to claim 1, wherein the operating conditions of the motor vehicle are used to define the filter functions, the filter functions being varied as to at least one of slope maximum value, minimum value, and range limits.

3. Process according to claim 2, wherein each operating condition comprises at least one of a current driving situation of the motor vehicle, a current speed, the transmission ratio, driver type, and the.

4. Process according to claim 1, wherein determining the current filter function comprises selecting a filter function from the set of filter functions.

5. Process according to claim 1, wherein determining the current filter function comprises selecting at least two filter functions from the set of filter functions.

6. Process according to claim 5, wherein determining the current filter function further comprises interpolating between the selected at least two filter functions.

7. Process according to claim 1, wherein determining the current filter function comprises interpolating from a characteristic field.

8. Process for controlling a continuously variable transmission in a motor vehicle comprising the steps of:
   determining a transmission input speed deviation from a desired transmission input speed and an actual transmission input speed;
   maintaining a set of filter functions, each filter function corresponding to an operating condition of the motor vehicle and defining a relationship between transmission input speed deviation and desired transmission input speed gradient;
   determining a current filter function based on a current operating condition of the motor vehicle and the set of filter functions;
   determining a desired transmission input speed gradient from the current filter function and the transmission input speed deviation;
   determining an actual transmission input speed gradient from the actual transmission input speed;
   determining a transmission ratio from the desired transmission input speed gradient and the actual transmission input speed gradient; and
   determining the actual transmission input speed from the transmission ratio and a transmission output speed, thereby controlling the continuously variable transmission.

9. Process according to claim 8, wherein the operating conditions of the motor vehicle are used to define the filter functions, the filter functions being varied as to at least one of slope, maximum value, minimum value, and range limits.

10. Process according to claim 9, wherein each operating condition comprises at least one of a current driving situation of the motor vehicle, a current speed, the transmission ratio, driver type, and the transmission input speed deviation.

11. A controller according to claim 9, wherein determining the current filter function comprises interpolating from a characteristic field.

12. A controller according to claim 8, wherein determining the current filter function comprises selecting a filter function from the set-of-filter functions.

13. A controller according to claim 8, wherein determining the current filter function comprises selecting at least two filter functions from the set of filter functions.

14. A controller according to claim 13, wherein determining the current filter function comprises interpolating between the selected at least two filter functions.

15. A controller for controlling a continuously variable transmission in a motor vehicle comprising:
   a first element for determining a transmission input speed deviation from a desired transmission input speed and an actual transmission input speed;
   a first maintaining element for maintaining a set of filter functions, each filter function corresponding to an operating condition of the motor vehicle and defining a relationship between transmission input speed deviation and desired transmission input speed gradient;
   a first control element coupled to the first element and the first maintaining element for determining a current filter function based on a current operating condition of the motor vehicle and the set of filter functions, and for determining a desired transmission input speed gradient from the current filter function and the transmission input speed deviation;
   a second element for determining an actual transmission input speed gradient from the actual transmission input speed;
   a third element coupled to the first control element and the second element for determining a transmission ratio from the desired transmission input speed gradient and the actual transmission input speed gradient; and
   a fourth element coupled to the first, second, and third elements for determining the actual transmission input speed from the transmission ratio and a transmission output speed.

16. A controller according to claim 15, wherein the operating conditions of the motor vehicle are used to define the filter functions, the filter functions being varied as to at least one of slope, maximum value, minimum value, and range limits.

17. A controller according to claim 16, wherein each operating condition comprises at least one of a current driving situation of the motor vehicle, a current speed, the transmission ratio, driver type, and the transmission input speed deviation.

18. A controller according to claim 15, wherein the first control element determines the current filter function by selecting a filter function from the set of filter functions.

19. A controller according to claim 15, wherein the first control element determines the current filter function by selecting at least two filter functions from the set of filter functions.

20. A controller according to claim 15, wherein the first control element determines the current filter function by interpolating from a characteristic field.

* * * * *